United States Patent [19]

Golan

[11] Patent Number: 5,281,331
[45] Date of Patent: Jan. 25, 1994

[54] RADIATOR FLUID FILTER

[76] Inventor: Ilan Z. Golan, 4404 Elenda St., Culver City, Calif. 90230

[21] Appl. No.: 967,830

[22] Filed: Oct. 28, 1992

[51] Int. Cl.5 ............... B01D 35/02; B01D 35/14
[52] U.S. Cl. ........................... 210/131; 210/167; 210/171; 210/435; 210/445; 210/446; 210/450; 210/463; 210/499; 123/41.04
[58] Field of Search ............... 210/131, 136, 167, 171, 210/299, 305, 306, 435, 445, 446, 450, 463, 499; 123/41.04, 41.08

[56] References Cited

U.S. PATENT DOCUMENTS

| | | | |
|---|---|---|---|
| 1,832,776 | 11/1931 | Hudson | 210/94 |
| 1,931,988 | 10/1933 | Hromadka | 210/306 |
| 1,950,254 | 3/1934 | Lien | 210/306 |
| 3,682,308 | 8/1972 | Moon | 210/167 |
| 3,941,697 | 3/1976 | Johnson | 210/167 |
| 4,052,308 | 10/1977 | Higgs | 210/167 |
| 4,271,016 | 6/1981 | Albertson | 210/167 |
| 4,444,247 | 4/1984 | Franck et al. | 210/167 |
| 4,488,961 | 12/1984 | Spencer | 210/136 |
| 4,743,369 | 5/1988 | Geermans et al. | 210/167 |
| 5,024,757 | 6/1991 | Malak | 210/136 |

Primary Examiner—Peter A. Hruskoci
Assistant Examiner—Robert James Popovics
Attorney, Agent, or Firm—Blakely, Sokoloff, Taylor, Zafman

[57] ABSTRACT

A filtering apparatus for filtering contaminants from a cooling system for an internal combustion engine with a liquid cooled radiator comprising a filtering screen to remove unwanted contaminants from the radiator fluid without substantially restricting fluid flow. Placed in a direct flowpath of the fluid, the filtering screen comprises a filtering surface and a semi-detachable precut flap. The precut flap can be partially cut to open once a specific flow pressure is reached thereby, as filtered contaminants become deposited on the filtering surface and increase in the flow pressure, the precut flap will open in the direction of the flow so as to provide sufficient fluid for the successful operation of the cooling system.

9 Claims, 2 Drawing Sheets

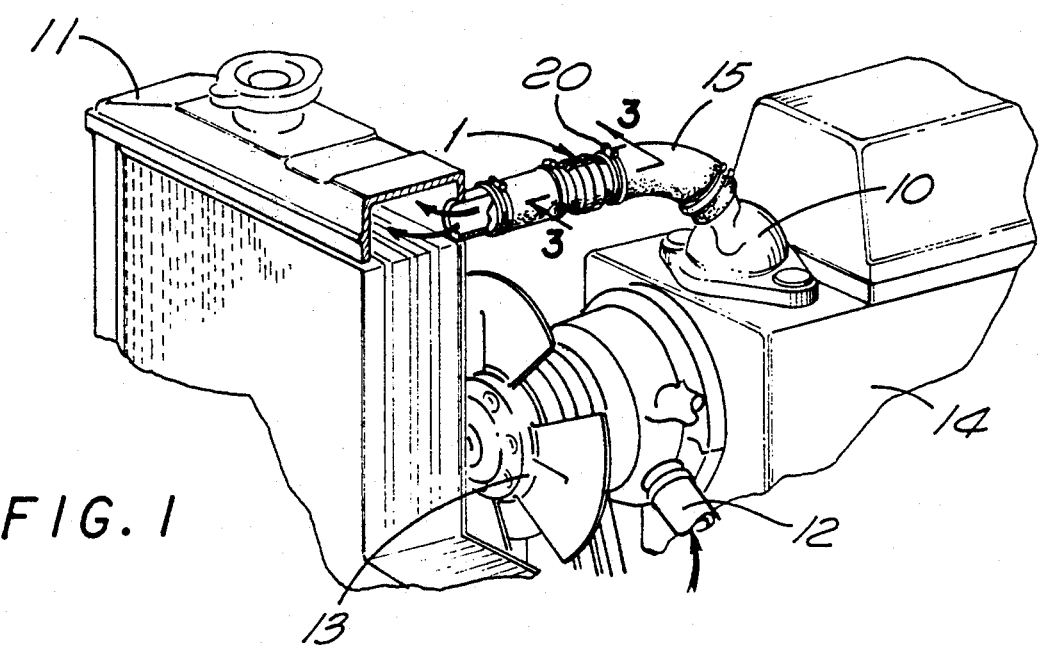
FIG. 1
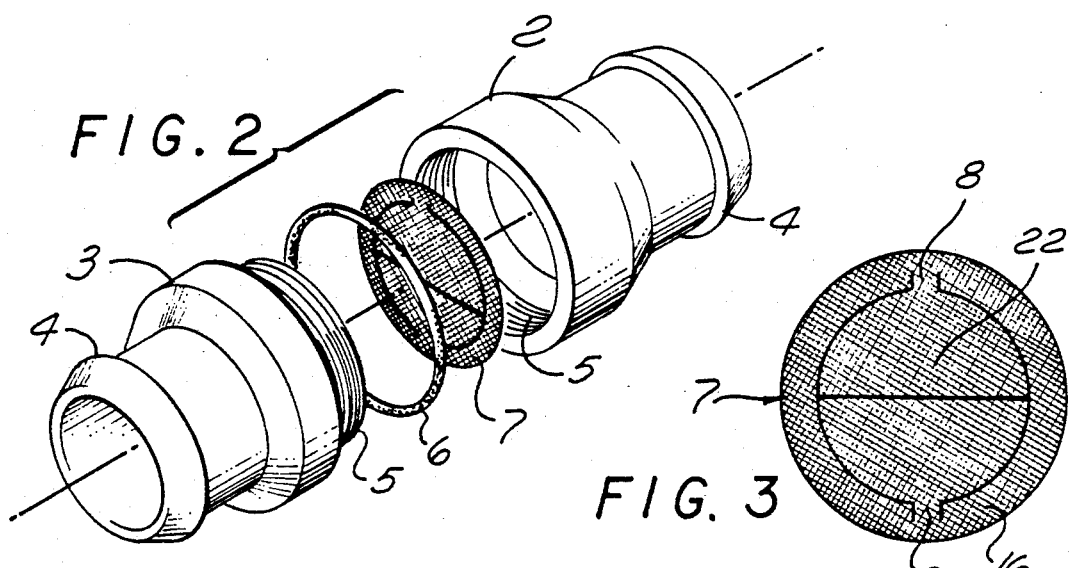
FIG. 2
FIG. 3
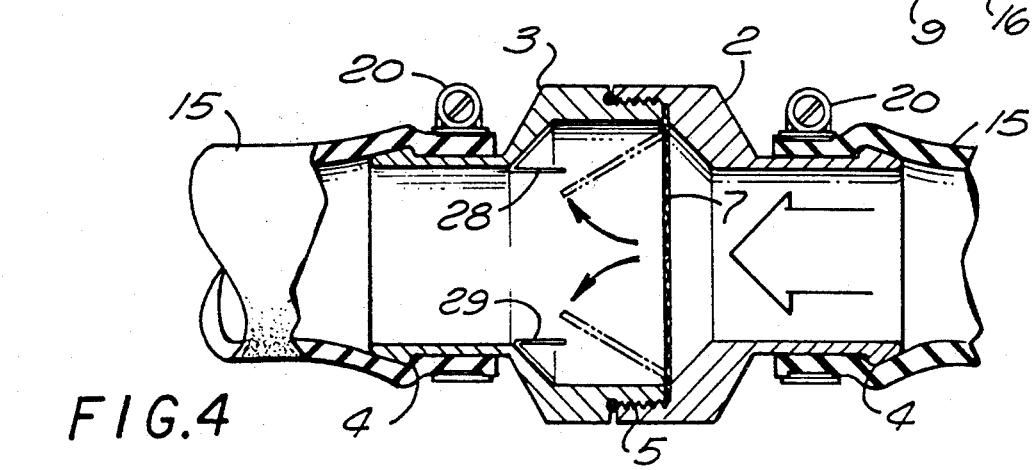
FIG. 4

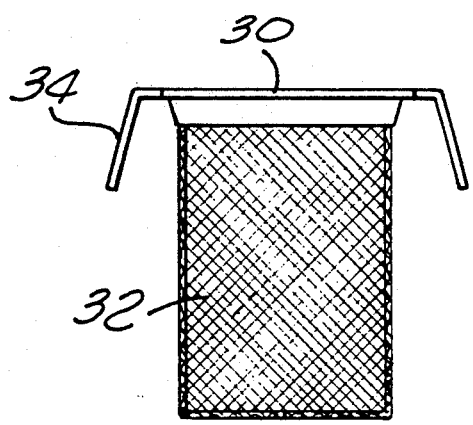
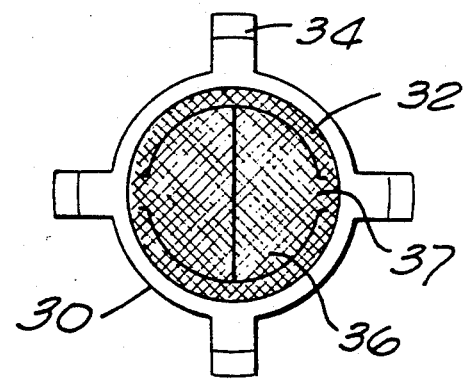
FIG. 5  FIG. 6
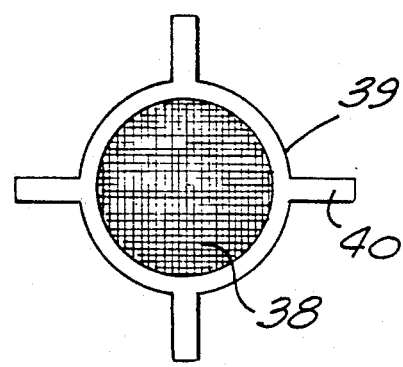
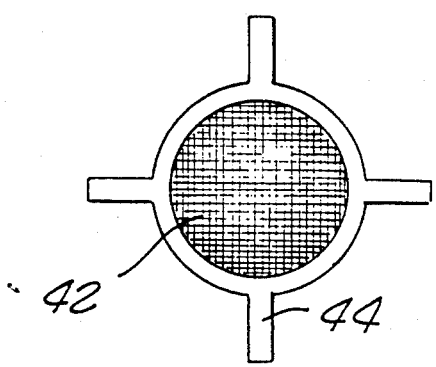
FIG. 8  FIG. 10
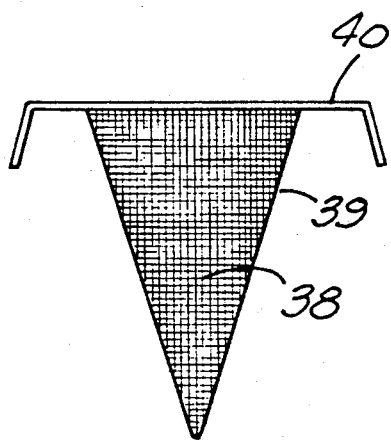
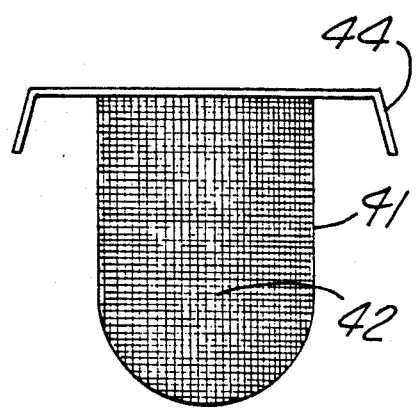
FIG. 7  FIG. 9

RADIATOR FLUID FILTER

BACKGROUND OF THE INVENTION

1. Field of the Invention

The present invention relates to a filtering apparatus. More particularly, the present invention relates to an apparatus for filtering contaminants, particles and the like from a cooling system working in conjunction with an internal combustion engine.

2. Art Background

It is commonly known that all types of fluids are easily susceptible to contamination. Thus, over the years, our society has developed a number of filtering systems to remove unwanted contaminants from certain fluids. For example, filtering systems have been widely used by cities and counties throughout the United States to remove unwanted contaminants from local water supplies so as to provide suitable drinking water for its citizens. Even commercial products, such as household faucets, have been designed to include a filtering system to prevent debris from the water pipes from getting into your drinking water. Besides being used to protect the health of the populous, filtering systems have been incorporated in many commercial products, such as an automobile, truck or generally any machine relying on an internal combustion engine, to improve the product's performance and extend its useful life.

Many years ago, the automotive industry realized that internal combustion engines operate more efficiently for a longer duration if unwanted contaminants are prevented from entering the engine and becoming deposited therein. Thus, in order to protect the engine from damaging contaminants thereby extending the useful life of its engine, the automotive industry began to incorporate filtering devices, particularly within the fuel lines ("fuel filters") and the oil lines ("oil filters").

These filters, which are installed originally and can be purchased as an after-market product, have been positioned within an accessible area of the engine so that ordinary consumers can replace these inexpensive filters once the vehicle is driven a certain number of miles or after a certain time period has expired. By routinely replacing these filters, consumers directly increase the useful life of their cars and enable their cars to perform at their optimum level. Although these filters protect the engine from contaminants, there is no such filtering device to prevent unwanted contaminants, particles and the like from damaging the radiator within the cooling system.

Car engines are formed by metal casting which provides a somewhat rough grain surface, which, over time, results in the accumulation of small particles in the radiator fluid as the granules break off from the surface. Additionally, corrosion occurs in the radiator over time causing an accumulation of "rust" particles as well. A few years ago, radiators were designed with metal heads so that the rectangular tubing within the radiator casing could be easily cleaned by welding the head open and removing the radiator rectangular tubing. In today's disposable society, radiators are designed with plastic heads so that the tubes cannot be removed. Thus, without a way to clean the rectangular tubing, the entire radiator must be replaced which costs consumers hundreds of dollars in unnecessary repairs, causes consumers the inconvenience of waiting many hours to get their car repaired, and unnecessarily wastes natural resources.

It would be a great advantage and, is therefore an object of the present invention, to provide a filtering apparatus for the cooling system with the purpose of extending the useful life of the radiator.

SUMMARY OF THE INVENTION

It is an object of the present invention to provide a filtering apparatus for preventing harmful contaminants, particles and the like from entering into and becoming deposited within the radiator tubes.

It is also an object of the present invention to provide an inexpensive means of maintaining optimal performance of a cooling system.

It is another object of the present invention to provide an inexpensive means of extending the useful life of the radiator.

It is yet another object of the present invention to provide an additional safety feature to protect persons from being stranded or injured on the highways and streets.

It is another object of the present invention to prevent the needless waste of natural resources used in the construction of unnecessary replacement radiators.

These and other objects of the present invention are provided in the cooling system filtering apparatus in which the filtering apparatus is inserted in line with a radiator hose connecting the thermostat and the radiator. A small middle section of the radiator hose is cut out and replaced with the filtering apparatus secured by a clamping means in order to firmly hold the filtering apparatus in place. As the water-coolant fluid within the engine is released by the thermostat, it flows through the radiator hose and enters an inlet of the filtering apparatus. The fluid flows through a filtering screen containing small apertures. These apertures permit the removal of contaminants and other materials from the fluid without substantially restricting the flow of the fluid. Therefore, a water-coolant fluid, without any large contaminants, flow into the radiator thereby diminishing the likelihood that deposits will be formed within the radiator tubes.

In its preferred embodiment, the filtering screen comprises of an apertured filtering surface with partially precut flaps which open once the flow pressure against the filtering screen exceeds the flow resistance of the precut flaps. This optional safety feature prevents the screen from being totally clogged thereby causing a blockage in the radiator which in turn may cause the hoses or seals of the engine to burst.

BRIEF DESCRIPTION OF THE DRAWINGS

The objects of the present invention will be described with respect to the following figures in which:

FIG. 1 is an illustration of cooling system filtering apparatus in combination with a portion of an engine assembly.

FIG. 2 is an exploded perspective view of the preferred embodiment of the cooling system filtering apparatus in accordance with the present invention.

FIG. 3 is a front view of the filter screen of FIG. 2.

FIG. 4 is a cross-sectional view of the present invention under conditions in which the flow pressure by the water-coolant fluid exceeds the flow resistance of the precut filtering screen.

FIG. 5 is a side view of an alternative embodiment of the present invention.

FIG. 6 is a partial end view of the embodiment shown in FIG. 5.

FIG. 7 is a side view of an alternative embodiment of the present invention.

FIG. 8 is a partial end view of the embodiment shown in FIG. 7.

FIG. 9 is a side view of an alternative embodiment of the present invention.

FIG. 10 is a partial end view of the embodiment shown in FIG. 9.

DETAILED DESCRIPTION OF THE INVENTION

An apparatus is described which is useful in extending the lifetime of a radiator as well as maintaining optimal performance of a vehicle's cooling system. The preferred embodiment of the present invention might best be described as a filtering screen secured within a housing tube which prevents unwanted contaminants and the like from circulating through the cooling system and leaving deposits in the radiator tubes. Such an apparatus not only saves consumers the unnecessary costs associated with replacing radiators, but also eliminates the inconveniences associated with obtaining such replacements. It should be borne in mind that the present invention need not be limited in use for radiators, or even cooling systems for internal combustion engines in general. The present invention may find wide application for filtering any fluid conveying channel.

Referring now FIG. 1, the preferred embodiment filtering apparatus is illustrated in relation to a portion of the engine assembly. The filtering apparatus 1 is inserted in line with a radiator hose 15 connecting the thermostat 10 and the radiator 11. A small middle portion of the radiator hose 15 is cut out and replaced by the filtering apparatus 1, which are fastened to the radiator hose 15 by clamps 20 or any other securing device to prevent slippage.

A water-coolant fluid is pumped into the engine 14 through an opening 12 located in close proximity to the base of the motor fan 13. The fluid cools the engine 14 by pulling heat from it. The thermostat 10 monitors the temperature of the water-coolant fluid and will not release the fluid until it reaches a certain temperature. Once the fluid within the engine pulls enough heat from the engine to reach this temperature, the thermostat 10 opens and releases the fluid into the radiator hose 15. This fluid is likely to contain contaminants from the engine. As the contaminated fluid flows through the radiator hose 15, it enters the filtering apparatus 1 which prevents contaminants within the fluid from entering the radiator 11 without substantially restricting the flow of the fluid into the radiator 11 as denoted by the dual arrows. The filtered fluid proceeds through the radiator tubing 12, releases the stored heat, and circulates back into the engine 14.

Referring now to FIGS. 2 and 3, the preferred embodiment of the filtering apparatus is illustrated, FIG. 2 showing an exploded view of the present invention and FIG. 3 illustrating the front view of the filtering screen. The filtering apparatus comprises a housing tube containing a filter screen 7. In the preferred embodiment, the housing tube is separated into two portions, the inlet housing unit 2 and an outlet housing unit 3, both of which are made of thermoplastic or a metal alloy or similar material. The inlet housing unit 2 is mechanically coupled to the portion of the radiator hose 15 attached to the thermostat 10 in which the interior cross sectional area of the inlet housing unit at the point of coupling is less than the interior cross sectional area of the radiator hose. The inlet housing unit has an increasing cross sectional area. The outlet housing unit is coupled to the portion of the radiator hose 15 attached to the radiator 11 in which the interior cross sectional area of the outlet housing unit at the point of coupling is also less than the interior cross sectional area of the radiator hose. The outlet housing unit has a decreasing cross sectional area. Both the inlet housing unit 2 and the outlet housing unit 3 provide an outer lip 4 around the exterior circumference of both housing units in order to guarantee a secure, leak resistant connection with the radiator hose 5. A coupling (not shown) may be provided to secure the hose 15 to the housing units 2 and 3.

Both the inlet housing unit and the outlet housing unit may be coupled by any mechanical or adhesive means. In the preferred embodiment for a metal device, these units are coupled by a threading means 5, which, in combination with an O-ring 6 or other type of washer, prevents leakage of water-coolant fluid as it flows through the filtering apparatus 1. The filtering screen 7, having a circumference larger than the interior circumference of radiator hose 15, is placed within the interior of the inlet housing unit 2 and secured by the outlet housing unit 3 when it is threaded with the inlet housing unit 2. For a thermoplastic housing, it could be made of a single piece of thermoplastic with a filter screen fused therein, or it could be made of two or more pieces which are glued or otherwise affixed together.

FIG. 3 illustrates the preferred embodiment of the filtering screen 7. The filtering screen 7 is comprised of an apertured surface in which its lattices are arranged to leave small apertures 16 within the filtering screen 7. The purpose of the apertures 16 is to remove large contaminants from the water-coolant fluid without substantially restricting the fluid flow between the radiator and the thermostat. However, as the contaminants are filtered from this fluid and deposited on the filtering screen 7, these deposited contaminants impede the flow of the water-coolant fluid. As a result, the flow pressure on the surface of the filtering screen increases. Thus, in order to prevent a substantial decrease of water-coolant flowing into the radiator which may cause overheating, the filtering screen 7 is partially precut so as to open once the flow pressure exerted on the filtering screen by the water-coolant fluid is greater than the flow resistance of the precut flaps. The flow pressure will exceed the flow resistance of the precut flaps when a majority of the surface area of the filtering screen is filled with contaminants.

The precuts are made within the circumference of the filtering screen 7 and comprise of two mirror-imaged semi-circular precut flaps sharing a common horizontal precut. Each of these precut flaps have a diametrically opposite tab 8 and 9, located on the arched portion of each semi-circular precut flap 22. These tabs 8 and 9 prevent the flap 22 from separating from the screen and entering the radiator 11 if the screen accumulates too many contaminant deposits such that the flow pressure from the water-coolant fluid is greater than the flow resistance of the filter screen precut flaps. Mostly, this is the case when the filtering screen is not replaced regularly.

FIG. 4 is a cut-away sectional view of the present invention taken along line 3 in FIG. 1 when the flow pressure is great enough to cause the precut flaps in the filtering screen to open. The arrow shown in the inlet housing unit 2 denotes the flow of the water-coolant fluid as it enters the inlet housing unit 2 from the thermostat. As contaminants accumulate on the surface area filtering screen 7, the flow pressure on the filtering screen 7 increases. Once this flow pressure is greater than the flow resistance of the precut flaps in the filtering screen, the screen will open in the direction of the flow to allow the water-coolant fluid to enter into the radiator so the radiator will not overheat and seize. Also as shown in FIG. 4, tabs 28 and 29 are provided to retain some of the contaminants and other debris in the event the screen ruptures as described.

FIGS. 5-10 illustrate alternative embodiments of the present invention which may be utilized in a radiator hose without having to cut the radiator hose to install the radiator filter.

As shown in FIG. 5, the radiator filter 30 comprises a filter means 32 which is generally a stainless steel screen or mesh in a cylindrical configuration, and a plurality of tabs 34 which may be bent into any desired shape. In use, the filter means is placed inside the radiator hose, or into the neck of the radiator with the tabs on the outside. The tabs are then folded back to prevent the filter means from being pulled into the radiator hose or radiator as a result of the fluid flow. FIG. 6 illustrates a partial view of the radiator filter 30 of FIG. 5 and demonstrates that the break-away feature of the embodiment described above with reference to FIGS. 1-4, can be incorporated into this embodiment as well. Specifically, the filter means 32 is comprised of at least one break-away portion 36 which is partially pre-cut at all points except tab 37 to break away and open the flow under extreme pressure without entirely separating from the filter means. The break-away feature is optional in this embodiment because the surface area of the filter means is so large.

Similar to the embodiment of FIGS. 5 and 6 are the embodiments of FIGS. 7-10. In FIGS. 7 and 8, the radiator filter 39 has a filter means 36 which is conical and tabs 40 are similar in form and function to tab 37 of the embodiment of FIGS. 5-6. In FIGS. 9 and 10, the radiator filter 41 has a filter means 42 which is generally cylindrical with a rounded bottom surface and tabs 44 are similar in form and function to tab 37 of the embodiment of FIGS. 5-6.

The filtering apparatus described herein may be manufactured by many different methods and from many different materials. For example, the housing tube can be manufactured as a single unit or as a plurality of units coupled together. Moreover, the filtering apparatus can be designed as a completely disposable plastic unit. Various filtering devices may be provided to accommodate different situations. While the present invention has been described in terms of various embodiments, other embodiments may come to mind to those skilled in the art without departing from the spirit and scope of the present invention. The invention should, therefore, be measured in terms of the claims which follow.

I claim:

1. In a combustion engine having a liquid cooled radiator system, the improvement comprising a filtering apparatus for removing contaminants from radiator fluid of an internal combustion engine without substantially restricting fluid flow through the filtering apparatus, said filtering apparatus comprising:
   a filtering screen disposed in said filtering apparatus in a direct flow path of said fluid, said filtering screen having a partially precut portion wherein when said partially precut portion is placed under a predetermined pressure, it partially tears from said filtering screen to permit at least partially unrestricted fluid flow therethrough, and
   retaining means for retaining said filtering screen in said direct flow path of said fluid.

2. The filtering apparatus according to claim 1 further comprising a housing for retaining said filter screen, said housing being installed in line in a hose for said radiator.

3. The filtering apparatus according to claim 2 wherein said housing is made of a metal.

4. The filtering apparatus according to claim 2 wherein said housing is made of a thermoplastic.

5. A filtering apparatus for removing contaminants from a fluid without substantially restricting fluid flow through the filtering apparatus, comprising:
   a housing tube having an inlet and an outlet for receiving and passing fluid therethrough;
   a filtering screen positioned within said housing tube and secured thereto being in a direct flow path of said fluid, said filtering screen comprising and apertured filtering surface for removing contaminants from the fluid and a semi-detachable precut flap.

6. The filtering apparatus according to claim 5 wherein said precut flap opens in the direction of the fluid flow if pressure exerted on said filtering surface by said fluid is greater than the flow resistant of the precut flap.

7. The filtering apparatus according to claim 5 further comprising a pocket means comprising a partially enclosed chamber constructed and arranged to restrict the flow of particles downstream from said filter screen, said pocket means being in fluid communication with said fluid for retaining contaminants in said fluid if said precut flap opens, said pocket means being disposed adjacent and downstream from said filtering screen.

8. A radiator filtering apparatus for removing contaminants from radiator fluid without substantially restricting fluid flow through the filtering apparatus, comprising:
   a housing tube having an inlet and an outlet positioned opposite to each other for receiving and passing fluid therethrough;
   a filtering screen positioned within said housing tube and secured thereto so as to be in a direct flowpath of said fluid, said filtering screen comprises an apertured surface for removing contaminants and a semi-detachable precut flap which opens in the direction of the fluid flow if pressure exerted on the apertured surface by the fluid is greater than the flow resistance of the precut flap, said precut flap comprises two mirror-imaged semi-circular precut flaps sharing a common horizontal precut and has an arched region for each of the precut flaps, each of said precut flaps has a diametrically opposed tab located in the arched region of each of said precut flaps for preventing said precut flaps from completely separating from said filtering screen.

9. The filtering apparatus according to claim 8 further comprising a pocket means comprising a partially enclosed chamber, said pocket means being in fluid communication with said fluid for retaining contaminants in said fluid if said precut flap opens, said pocket means being disposed adjacent and downstream from said filtering screen.

* * * * *